United States Patent [19]

Sain et al.

[11] 4,324,516
[45] Apr. 13, 1982

[54] TIRE SECURITY CAP

[75] Inventors: Bernard S. Sain; James M. Dudley, both of Jacksonville, Fla.

[73] Assignee: Trailer Marine Transport Corporation, Jacksonville, Fla.

[21] Appl. No.: 153,081

[22] Filed: May 27, 1980

[51] Int. Cl.³ .............................................. F16B 31/02
[52] U.S. Cl. .......................................... 411/5; 411/910
[58] Field of Search ................... 411/5, 3, 2, 374, 910, 411/429, 427, 432; 70/259, 260, 230, 229, 231

[56] References Cited

U.S. PATENT DOCUMENTS

| | | | |
|---|---|---|---|
| 3,241,427 | 3/1966 | Bosler | 411/314 X |
| 3,492,841 | 2/1970 | Ipri | 411/910 X |
| 3,978,761 | 9/1976 | Sosinski | 411/5 |
| 4,037,515 | 7/1977 | Kesselman | 411/910 X |

*Primary Examiner*—Ramon S. Britts
*Attorney, Agent, or Firm*—Ernest M. Anderson

[57] ABSTRACT

A lug nut attachment is provided for detecting the removal of a wheel lug nut, a device that serves as a tire security cap. The cap comprises a breakable shroud and means for mounting the cap to one lug nut of a wheel. When mounted thereto the cap encloses the lug nut and prevents access thereto until the shroud is broken.

4 Claims, 5 Drawing Figures

TIRE SECURITY CAP

SUMMARY OF THE INVENTION

This invention relates generally to seals and protective devices for detecting the removal of a wheel from a vehicle. More particularly, the invention involves a lug nut attachment designed to be secured to one of the wheel lugs on each wheel of a vehicle. The attachment is so constructed that it cannot be removed except by breaking the same and thereby indicating that the wheel may have been removed from the vehicle. This is of considerable importance to the owners of vehicles which are either rented or consigned to others. Experience has found that vehicles shipped with new tires have arrived with old tires instead, and it has been virtually impossible to fix responsibility for thefts which have occurred. With that object in mind the present invention was conceived.

In brief, the invention herein described comprises a lug nut cap attachment that may be readily applied to one of the lug nuts of a wheel. The attachment consists of a breakable shroud having a skirt and means for securing the shroud to a lug nut, said skirt enclosing the lug nut and preventing access thereto until the shroud is broken and removed.

It is to be understood, therefore, that one object of the present invention is to provide a novel security device for detecting the unpermitted removal of wheels from a vehicle.

Another object of the invention is to provide a novel lug nut cap attachment that may be inexpensively manufactured and secured with a minimum of effort.

Other objects of the invention will become apparent in view of the following detailed description.

In the drawings forming a part of this application and in which like parts are identified by like reference numerals throughout the same, FIG. 1 is an exploded view of a preferred embodiment of the invention shown in spaced relationship to a lug nut and a portion of a wheel hub;

Figure 1:
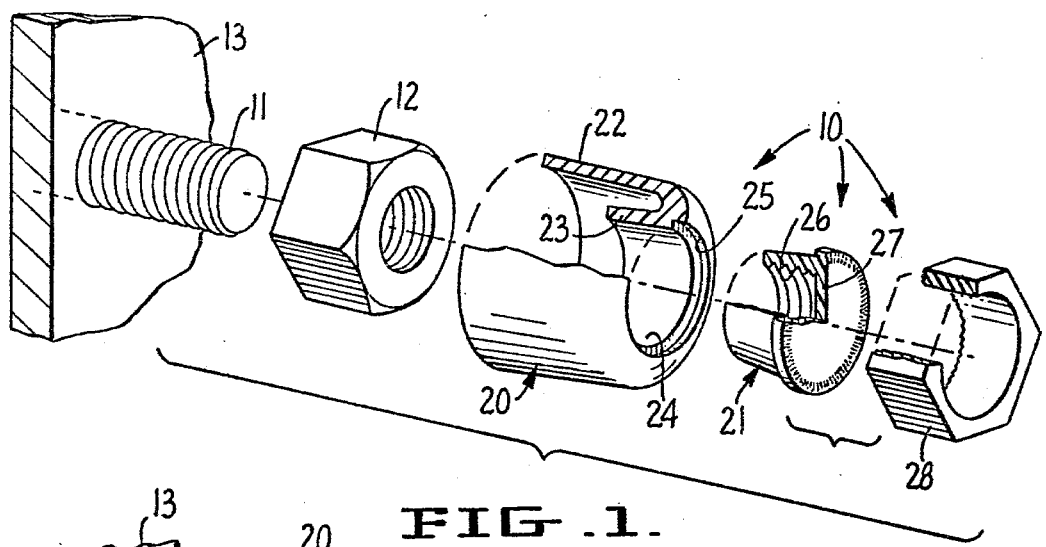

Referring to the drawings there is shown a preferred embodiment of the invention in a lug nut cap assembly 10 that may be mounted to the end of a lug 11 to which there has already been applied the lug nut 12. In the conventional manner lug nut 12 clamps plate 13 of a wheel hub against the axle mount 14, five such lugs and lug nuts being usually provided. It is contemplated, however, that only one assembly 10 need be provided per wheel since no wheel can be removed without first removing all of the lug nuts.

The present invention more particularly relates to the construction of the lug nut cap attachment 10, comprising a breakable shroud 20 and a threaded sleeve 21, which serves as a means for rotatably mounting shroud 20 on the end of lug 11. Both shroud 20 and sleeve 21 may be formed of an inexpensive brittle styrene plastic. The selection of material and wall thicknesses should be made on the basis of a design such that the shroud will crack if any pressure is applied to its exterior surface.

Shroud 20 essentially comprises a skirt 22 and an axially tapered collar 23 which extends inwardly from a front opening 24 and a peripheral recess 25. The rear opening of skirt 22 is larger than lug nut 12 for receiving the lug nut coaxially therewithin.

Sleeve 21 has an internal thread 26 which corresponds to the exterior thread of wheel lug 11. Sleeve 21 is also sized to be received within collar 23, and the inner surface of collar 23 and the outer surface of sleeve 21 are correspondingly tapered axially of lug 11. The outer end of sleeve 21 is sealed off by an integrally formed wall 27 and a breakaway nut 28. Wall 27 projects laterally outward from the tapered portion of sleeve 21, providing a step or flange 27a that may be received within the recess 25 of shroud 20. The wall thickness which integrally connects breakaway nut 28 with wall 27 is selected to fracture once sleeve 21 is threaded upon nut 11 and bottomed against the attached lug nut 12.

Figure 2:
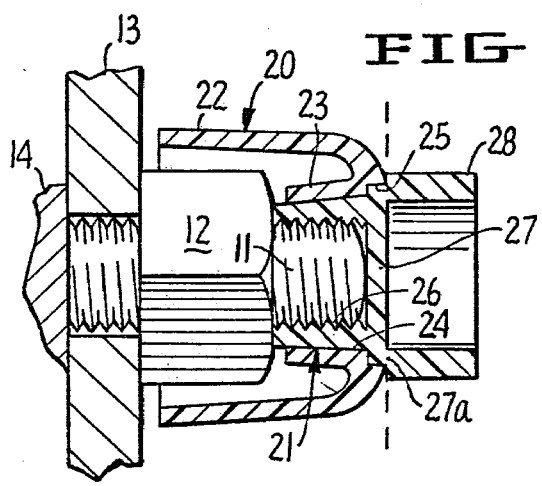
FIG. 2 is a center section taken through the lug nut cap attachment as partially mounted to the lug nut.
Figure 3:
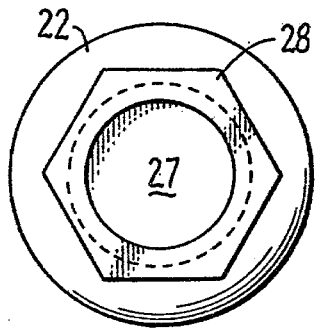
FIG. 3 is a front elevation of the lug nut cap as shown in FIG. 2.
Figure 4:
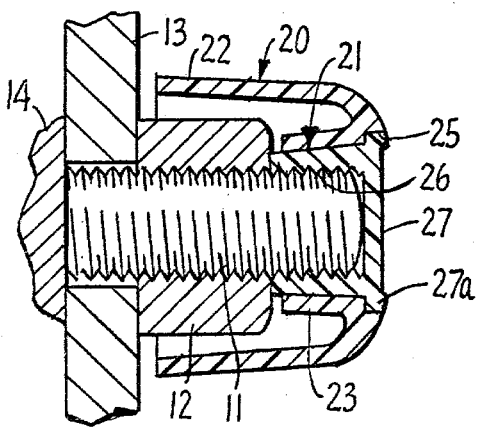
FIG. 4 is a center section of the lug nut cap attachment fully assembled to the lug nut.
Figure 5:
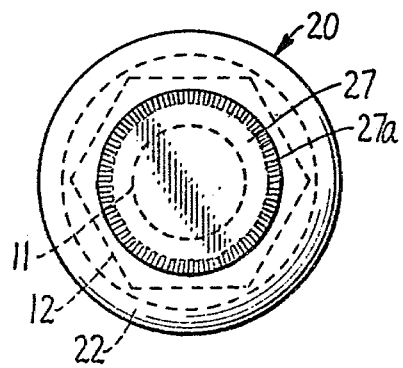
FIG. 5 is a front elevation of the attachment as shown in FIG. 4.

In operation, lug nut cap assembly 10 is mounted to the end of lug nut 11 by inserting sleeve 21 through collar 23 of shroud 20 and threadably securing the sleeve to the exposed end of lug 11, as shown in FIG. 2. In a preferred embodiment, as shown, the axial length of sleeve 21 is greater than the axial length of collar 23, allowing the sleeve to be threaded onto the lug and bottomed against the attached lug nut 12 while providing slight axial spacing between the inward end of the collar and the lug nut. This allows the shroud to be rotated freely upon sleeve 21 but held thereto by reason of the conical taper of the sleeve and collar, and by surface contact between flange 27a and recess 25.

It is intended that sleeve 21 be applied to the end of lug 11 with sufficient frictional engagement that mere counter rotation of either shroud 20 or finger pressure against the end wall 27 would be insufficient to unthread the sleeve. Breakaway nut 28 provides hexagonal surfaces that may be engaged with a wrench for both tightening sleeve 21 upon lug 11 and, after full threaded engagement, providing a breakaway force necessary to sever the nut from wall 27.

Although a preferred embodiment of the invention has been illustrated and described, various modifications and changes may be resorted to without departing from the spirit of the invention of the scope of the appended claims, and each of such modifications and changes is contemplated.

What is claimed is:

1. A lug nut cap attachment for detecting the removal of a wheel lug nut comprising: a frangible shroud having an outer skirt and an integral internal coaxial collar, said outer skirt defining a rear opening and housing for receiving a lug nut within said skirt and a front opening that provides a coaxial circular recess; means for attaching said shroud to a lug nut and comprising a sleeve having an internally threaded surface extending from one end for engagement with the exterior thread of a lug nut upon which said shroud is to be mounted, the threaded extension of said sleeve being adapted to be received through the front opening and coaxial collar of said shroud to be threadably engaged with a housed lug nut, said sleeve having a circular flange circumferentially larger than the internal circumference of said coaxial collar but receivable within the circular recess of said shroud; and a breakaway nut integrally formed with said sleeve as an axial extension of said circular flange, said breakaway nut projecting forwardly of the front opening of said shroud to provide an engageable means for threadably tightening said sleeve onto a lug nut and attaching said shroud.

2. The lug nut cap attachment of claim 1, said mounting means comprising a breakaway nut attached to one end of said sleeve, said nut being attached to said sleeve as to allow such sleeve to be threadably tightened onto a lug prior to breakaway.

3. The lug nut cap attachment of claim 1, one end of said sleeve being sealed by an integrally formed wall and a breakaway nut, said breakaway nut being axially accessable from the front side of said shroud to threadably tighten said sleeve onto a lug prior to being broken away from said wall.

4. The lug nut cap attachment of claim 1, said sleeve being formed with a circular flange at one end, the front opening of said shroud being defined by a circular recess for receiving the circular flange of said sleeve.

* * * * *